UNITED STATES PATENT OFFICE.

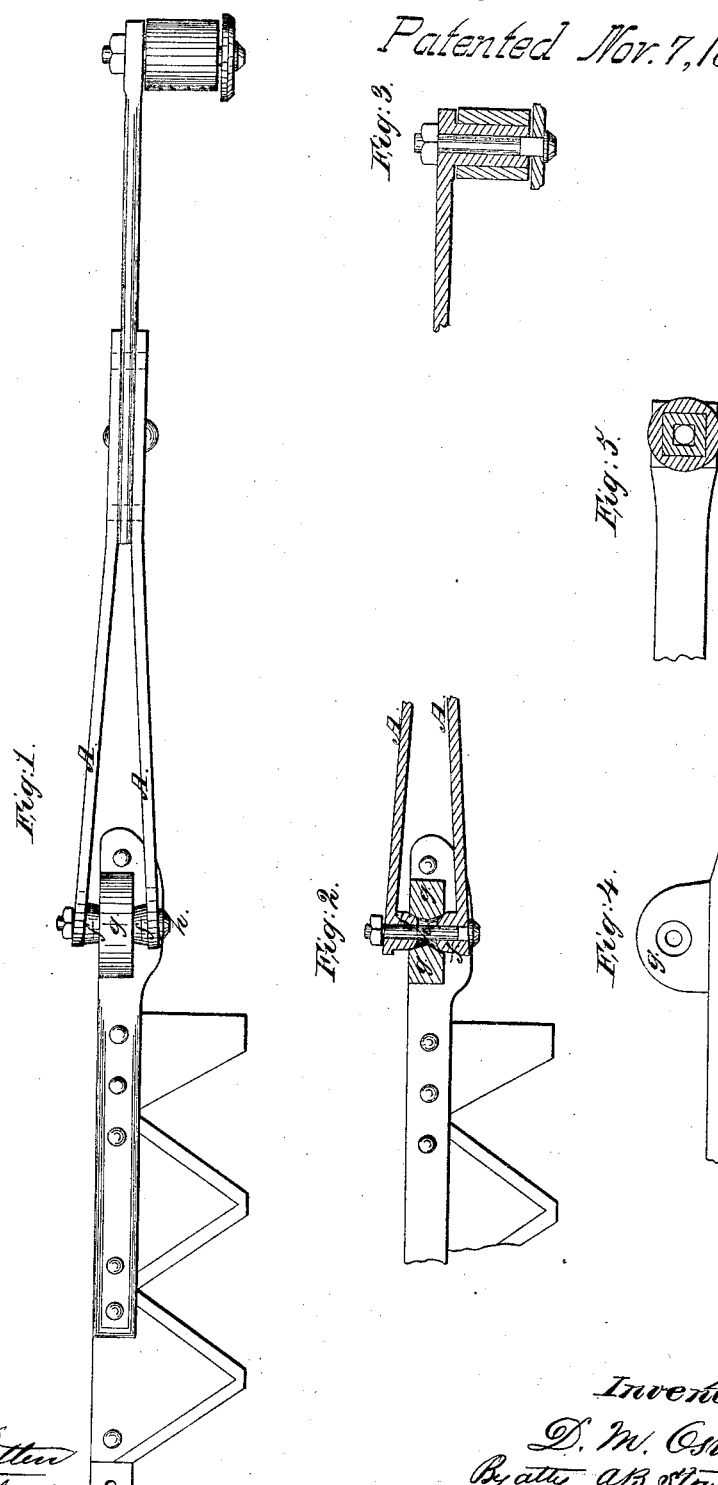

DAVID M. OSBORNE, OF AUBURN, NEW YORK, ASSIGNOR TO HIMSELF AND WM. A. KIRBY, OF SAME PLACE.

IMPROVEMENT IN PITMAN-CONNECTIONS FOR HARVESTERS.

Specification forming part of Letters Patent No. 50,879, dated November 7, 1865.

*To all whom it may concern:*

Be it known that I, DAVID M. OSBORNE, of Auburn, in the county of Cayuga and State of New York, have invented certain new and useful Improvements in Pitman-Connections for Harvesting-Machines and other similar purposes; and I do hereby declare the following to be a full, clear, and exact description of the same, reference being had to the accompanying drawings, making a part of this specification, in which—

Figure 1 represents a pitman with its connection, as proposed by my invention, to the sickle or cutting apparatus of a harvester. Fig. 2 represents a horizontal section through the device for connecting and adjusting the pitman to the cutters. Figs. 3 and 5 represent sections through the wrist-pin connection of the pitman; but as this constitutes the subject-matter of a separate application for Letters Patent, no further mention of this device is necessary here. Fig. 4 represents an elevation of the lug on the cutter-bar, to which the pitman is attached.

Similar letters of reference, where they occur in the separate figures, denote like parts in all the drawings.

The speed with which the pitman of a harvesting-machine moves causes much and rapid wearing away of its attachments, and consequent upon this wearing away follows much of the clatter and noise made by these machines while in operation.

The object and purpose of my invention is to prevent as much as possible this wearing away and consequent noise, and to compensate for or provide against so much of the evil as cannot be avoided.

I am aware that a connection between a pitman and cutter bar has been made through conical lugs, with a set-screw behind them or remote from them to take up the wear; but it is obvious that by such an arrangement the pressure is always brought upon a particular part of the lugs, and the wear is always on those points or parts—viz., the parts next the screw—and the tendency is to cut away those parts, and not to give a general bearing or surface contact all around the lugs, which is the only way to prevent wearing and clattering.

My invention consists in connecting the pitman to the cutters or cutter-bar by means of two conical lugs, which enter conical seats in the opposite sides of the lug or head of the cutter-bar, and passing a screw-bolt or its equivalent through the parts in the line of and directly through the apices of the conical lugs and recesses, so that any and all wear or slack motion between the pitman and cutter-bar may be taken up and at the same time maintain a uniform and general surface-contact throughout the parts, and thus prevent undue wearing away, as is the case where the take-up screw is remote from the lugs.

To enable others skilled in the art to make and use my invention, I will proceed to describe the same with reference to the drawings.

The end of the pitman A, which is connected to the cutters, is divided or spread, so that each portion thereof may have a conical lug, *f*, thereon, which enters from opposite sides of the head *g* into conically-countersunk openings or seats in said head, and a screw-bolt, *h*, passes directly through the lugs *f* and the hole or seats in the line of their apices, as shown in Figs. 1 and 2, to hold all firmly together, and with a uniform bearing-surface all around the conical lugs and seats. Now, when these lugs *f* wear away by use, and which may be readily discovered by the noise and clatter made by the loose play between them and the head *g*, it is only necessary to turn the nut of the bolt *h* slightly, and thus take up all the wear and cause the parts to run smoothly and preserve a constant and uniform bearing-surface around the lugs and their seats. If the tightening-screw be placed either to one side or the other of the line of bearing of the conical lugs the wearing away will be unequal and greater on the side next the screw than on the opposite side, for drawing up the two portions of the pitman at any point behind or in advance of the lugs would make them excessively tight on that side and correspondingly loose on the opposite side, as they would spring away from the cutter-bar head on the side opposite to that where the bolt is placed.

The pitman need not be made of three pieces, as shown, which would require riveting or bolting, as the two pieces constituting the cutter-bar end thereof may be extended so as to connect immediately with the wrist-pin at the other end; and by curving these pieces toward each other or by bracing them a very light and very stiff pitman may be made, and made cheaply, too.

Though I have described this device as applicable only to harvesting-machines, yet it may be advantageously applied to other things where it is desirable to have such a take-up arrangement, to prevent rattling, noise, or a shackling motion.

I do not, therefore, confine my application of this device to the pitmen of harvesting-machines, as any other pitman or connecting bar or rod may have it applied with a similar result.

Having thus fully described the nature, object, and purpose of my invention, what I claim therein as new, and desire to secure by Letters Patent, is—

Connecting the pitmen of harvesting-machines to the head of the cutter-bar or cutters or other connecting-bars to their supports by means of conical lugs fitting into conical seats and a draw or screw bolt passing through said lugs and seats in the line of their apices, substantially as and for the purpose described.

D. M. OSBORNE.

Witnesses:
 D. WRIGHT,
 ROLLIN TRACY.